Patented Nov. 19, 1935

2,021,475

UNITED STATES PATENT OFFICE 2,021,475

CATALYTIC COMPOSITION AND METHOD OF PRODUCTION

Richard E. Berthold, Richmond Hill, N. Y., assignor to Cardinal Products, Inc., a corporation of New York No Drawing. Application July 18, 1933, Serial No. 681,045

6 Claims. (Cl. 23—235)

This invention relates to a new composition of matter, and the method of producing the same, whereby pellets moulded therefrom will possess the property of becoming incandescent upon their absorption of alcoholic vapor in the presence of atmospheric air.

Pellets thus produced, are employed by me in lighters as the igniting media for cigarettes and the like.

Certain chemical substances are used in producing the aforesaid composition, these chemicals, in their relative proportions, being as follows:—

| | |
|---|---|
| Thorium nitrate | 100 grammes |
| Zirconium nitrate | 100 grammes |
| Aluminum nitrate | 25 grammes |
| Platinic chloride | 1 ounce |
| Barium platinum cyanide | 15 grammes |
| Cotton webbing | 5 pounds |

The cotton webbing is to be saturated with a combined solution of the aforesaid chemicals, then the webbing is to be dried and burnt.

Then the residue is to be treated successively, by filtration, with respective solutions of acid hydrofluosilicic, acid sulphuric and potassium cyanide, the residue of each filtration being separately washed.

The final residue is then heated until dry, when it is moistened with corn syrup and again dried, becoming granular.

This granular composition is then sifted through a fine sieve and the resulting powder is moulded, under pressure, into pellets of the desired shape and size.

The particular method employed by me in producing the aforesaid composition will now be described.

The stated quantities of the chemicals previously noted are used in the formation of these separate and distinct solutions:—

Thus the thorium nitrate, zirconium nitrate and aluminum nitrate are all dissolved in two quarts of distilled water. This solution will be referred to hereinafter as the "3 solution".

The platinic chloride is separately dissolved in a half pint of distilled water, heat being employed to aid in dissolving the platinic chloride. I prefer to place the vessel containing the solution in a hot water bath as the heating medium. This solution will be referred to hereinafter as the "4 solution".

The barium platinum chloride is dissolved in a half pint of distilled water and this solution will be referred to hereinafter as the "5 solution".

The "3 solution", "4 solution" and "5 solution" are then mixed together and the mixture thoroughly shaken in the containing vessel. This mixture is called the "all 5 solution".

Five pounds of cotton webbing, preferably in strips, is to be placed in an earthenware vessel and to be sprayed with all of the aforesaid "all 5 solution". Or, said "all 5 solution" may be poured into the vessel and the webbing added thereto to become thoroughly saturated therewith. The webbing, when saturated, may be passed through a wringer and then the strips of webbing are to be dried, as by placing them on a line, and preferably exposed to the sun.

When the webbing is dry it is to be reduced by calcination. In practice I suspend the strips over a porcelain pan and apply a flame thereto, allowing the black residue to be deposited in the pan.

This residue is then triturated to reduce it to a powdery state, and then a jet of gas is played upon the residue to complete the calcination.

The calcined residue is then placed in a filter paper in a funnel and a solution of 2 grammes of acid hydrofluosilicic dissolved in 1 quart of distilled water is poured over the residue. Then the residue in the filter is washed with steam heated water, the water being poured slowly through the filter in the proportion of 10 gallons to 1 ounce of residue. This treatment is intended for the purpose of rendering the composition porous.

Next, a solution of 10 grammes acid sulphuric to 1 quart of distilled water is poured over the residue in the filter. Then the residue in the filter is washed with steam heated water, using 10 gallons to the ounce of residue, as before. The purpose of this step is to drive out the hydrofluosilicic acid.

Next, a solution of 2 grammes of potassium cyanide to 1 quart of distilled water is poured over the residue in the filter. Then the residue in the filter is washed with steam heated water, using 10 gallons to the ounce of residue, as before. This step is performed in order to eliminate the chlorine.

The residue, which has been thus treated and washed, remains in the filter paper.

A hole is now punched through the apex of the filter paper, and a stream of water, blown from a wash bottle, washes the residue from the wall of the filter, through the hole, into a porcelain vessel. When the residue has settled in the vessel the clear water is drawn off.

Then the vessel containing the residue is placed over a pot of hot water and heated until the residue is dry.

When dry the residue is to be moistened with corn syrup to serve as a binder and is then placed in an electric oven, which removes the moisture and renders the compound granular.

Then the compound is to be sifted through a fine sieve, which may have a 36 gauge mesh, and the sifted powder may then be placed in moulds and formed into pellets or disks under pressure.

These pellets or disks, which may be provided within an aperture therethrough, are such as are used to constitute the catalytic elements employed in lighters according to my United States Patent No. 1,899,008, dated February 28, 1933, they having the property of becoming incandescent by absorption of the vapor of vaporizable fluid in the presence of air.

Variations within the spirit and scope of my invention are equally comprehended by the foregoing disclosure.

I claim:—

1. A composition of matter comprising the calcined residue of cotton saturated with a solution of thorium nitrate, zirconium nitrate, aluminum nitrate, platinic chloride and barium platinum cyanide, with the total amounts of nitrates, chloride and cyanide bearing a weight ratio to each other of about 14:2:1.

2. A composition of matter comprising the calcined residue of cotton saturated with a solution of thorium nitrate, zirconium nitrate, aluminum nitrate, platinic chloride and barium platinum cyanide, said residue having been treated successively with solutions of acid hydrofluosilicic, acid sulphuric and potassium cyanide.

3. The method of producing catalytic elements which consists in preparing a solution of thorium nitrate, zirconium nitrate, aluminum nitrate, platinic chloride and barium platinum cyanide, saturating cotton webbing with said solution, drying the webbing, reducing the webbing by calcination, treating the residue successively with solutions of acid hydrofluosilicic, acid sulphuric and potassium cyanide, washing the residue after each treatment, and finally moulding said residue into pellets.

4. The method of producing catalytic elements which consists in preparing a solution of thorium nitrate, zirconium nitrate, aluminum nitrate, platinic chloride and barium platinum cyanide, saturating cotton webbing with said solution, drying the webbing, reducing the webbing by calcination, treating the residue successively with solutions of acid hydrofluosilicic, acid sulphuric and potassium cyanide, washing the residue after each treatment, adding corn syrup to the residue, to form a moist compound, drying the compound and finally moulding it into pellets.

5. A catalytic element in the form of a pellet that is moulded from the residue of calcined cotton that has been saturated with a solution of thorium nitrate, zirconium nitrate, aluminum nitrate, platinic chloride and barium platinum cyanide, with the total amounts of nitrates, chloride and cyanide bearing a weight ratio to each other of about 14:2:1.

6. A catalytic element in the form of a pellet that is moulded from the residue of calcined cotton that has been saturated with a solution of thorium nitrate, zirconium nitrate, aluminum nitrate, platinic chloride and barium platinum cyanide, and treated successively with solutions of acid hydrofluosilicic, acid sulphuric and potassium cyanide.

RICHARD E. BERTHOLD.